United States Patent
Pellegrini et al.

(10) Patent No.: US 10,274,579 B2
(45) Date of Patent: Apr. 30, 2019

(54) METHOD FOR IMPROVING DIRECTION FINDING AND GEOLOCATION ERROR ESTIMATION IN A DIRECTION FINDING SYSTEM

(71) Applicant: BAE SYSTEMS INFORMATION AND ELECTRONIC SYSTEMS INTEGRATION INC., Nashua, NH (US)

(72) Inventors: Gerald J. Pellegrini, Bedford, NH (US); Richard E. Clymer, Concord, NH (US); Keith A. Struckman, Grand Junction, CO (US); Gideon Litoff, Arlington, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 182 days.

(21) Appl. No.: 15/459,748

(22) Filed: Mar. 15, 2017

(65) Prior Publication Data
US 2018/0267135 A1    Sep. 20, 2018

(51) Int. Cl.
*G01S 5/06*       (2006.01)
*G01C 21/16*      (2006.01)
*G05D 1/02*       (2006.01)
*G01S 5/02*       (2010.01)

(52) U.S. Cl.
CPC .............. *G01S 5/06* (2013.01); *G01C 21/16* (2013.01); *G01S 5/021* (2013.01); *G05D 1/0202* (2013.01)

(58) Field of Classification Search
CPC .......... G01S 5/06; G01S 5/021; G01C 21/16; G05D 1/0202
See application file for complete search history.

(56) References Cited

U.S. PATENT DOCUMENTS

| | | | |
|---|---|---|---|
| 7,233,285 B2 | 6/2007 | Struckman | |
| 7,268,728 B1 * | 9/2007 | Struckman | G01S 5/04 342/424 |
| 8,373,596 B1 * | 2/2013 | Kimball | G01S 3/146 342/444 |
| 2006/0087475 A1 * | 4/2006 | Struckman | G01S 5/04 342/451 |

(Continued)

*Primary Examiner* — Jeffrey C Boomer
(74) *Attorney, Agent, or Firm* — Antony P. Ng; Russell Ng PLLC

(57) ABSTRACT

A method for improving direction finding and geolocation error estimation in direction finding and geolocation systems is disclosed. The corresponding phases of the received signals are determined. After an initial target estimation point of the received signals has been identified, the initial target estimation point is projected onto the earth's surface. A search grid having multiple grid points is then overlaid on the projected initial target estimation point, surrounding the projected initial target estimation point. The phase of signals emitting from a theoretical emitter located at each of the grid points of the search grid is estimated. Correlation coefficients between the estimated phases of the emitting signals and the determined phases of the received signals are determined. An error ellipse can be generated around one of the grid points having the highest correlation coefficient, and a source emitter is likely to be located within the error ellipse.

21 Claims, 4 Drawing Sheets

(56) References Cited

U.S. PATENT DOCUMENTS

| | | | |
|---|---|---|---|
| 2007/0273576 A1* | 11/2007 | Struckman | G01S 3/146 342/156 |
| 2008/0167763 A1* | 7/2008 | Duranti | G05D 1/105 701/11 |
| 2009/0171583 A1* | 7/2009 | DiEsposti | G01S 5/0252 342/357.64 |
| 2017/0030996 A1* | 2/2017 | Fireaizen | G01S 5/02 |
| 2017/0082722 A1* | 3/2017 | Kabel | G01S 5/0205 |

* cited by examiner

METHOD FOR IMPROVING DIRECTION FINDING AND GEOLOCATION ERROR ESTIMATION IN A DIRECTION FINDING SYSTEM

TECHNICAL FIELD

The present disclosure relates to correlation-based direction finding systems in general, and in particular to a method for improving direction finding and geolocation error estimation in a direction finding system.

BACKGROUND

Direction finding (DF) is the process of obtaining the direction of arrival bearings of radio-frequency (RF) emitters of interest. Geolocation (GEO) is the process of determining the locations of RF emitters of interest based on DF estimates. DF and GEO are commonly utilized to identify, track and geolocate various sources of RF transmissions.

DF and GEO techniques for identifying and locating RE emitters are usually based on energy/amplitude comparison, interferometric, time-of-arrival (TOA), time-difference-of-arrival (TDOA) and other antenna null-steering approaches. These approaches typically require special antennas, close-tolerance amplitude/phase RF receiver components, enhanced receiver dynamic range and expanded processing bandwidth.

In general, a DF/GEO system collects RF signals from a source RF emitter by using an array of spatially displaced antennas. Nearly all DF algorithms require that signals received by the antennas are routed to multiple signal processors synchronously. These signal processors are then utilized to compare the amplitude/energy, phase and TOA/TDOA from the received signals in order to derive the location of the source RE emitter.

The combination of various DF and GEO techniques forms the basis of many complex DF systems. The present disclosure provides a method for improving GEO and GEO accuracy in a DF system.

SUMMARY

In accordance with one embodiment, signals received by a set of antenna elements are sampled and digitized. The signal with the strongest response is selected as a reference antenna, and the corresponding phase differences of the other received signals are then determined. When two or more antennas receive the signal, an initial direction to the target emitter can be ascertained. The angle to the initial target estimate from the received signals is projected onto the earth's surface. A search grid having multiple grid points is overlaid on the projected initial target estimation point, surrounding the projected initial target estimation point. The complex voltage (phase) from a theoretical emitter located at each of the grid points of the search grid is subsequently estimated. Correlation coefficients between the estimated complex voltages (phases) of the emitting signals and the determined phases of the received signals are determined. Each of the correlation coefficients reflects a level of similarity between the signals from the theoretical emitters and the received signal. An error ellipse can be generated in the region around the grid point(s) having the highest correlation coefficient. For direction finding error estimation, the error ellipse is the statistical spatial boundary that contains the source emitter. After the region of uncertainty has been ascertained, a new travel path can be initiated to avoid the source emitter.

The features and advantages described herein are not all-inclusive and, in particular, many additional features and advantages will be apparent to one of ordinary skill in the art in view of the drawings, specification and claims. Moreover, it should be noted that the language used in the specification has been selected principally for readability and instructional purposes and not to limit the scope of the inventive subject matter.

BRIEF DESCRIPTION OF THE DRAWINGS

The invention itself, as well as its modes of use, further objects, and advantages thereof, will best be understood by reference to the following detailed description of an illustrative embodiment when read in conjunction with the accompanying drawings, wherein.

DETAILED DESCRIPTION

Figure 1:
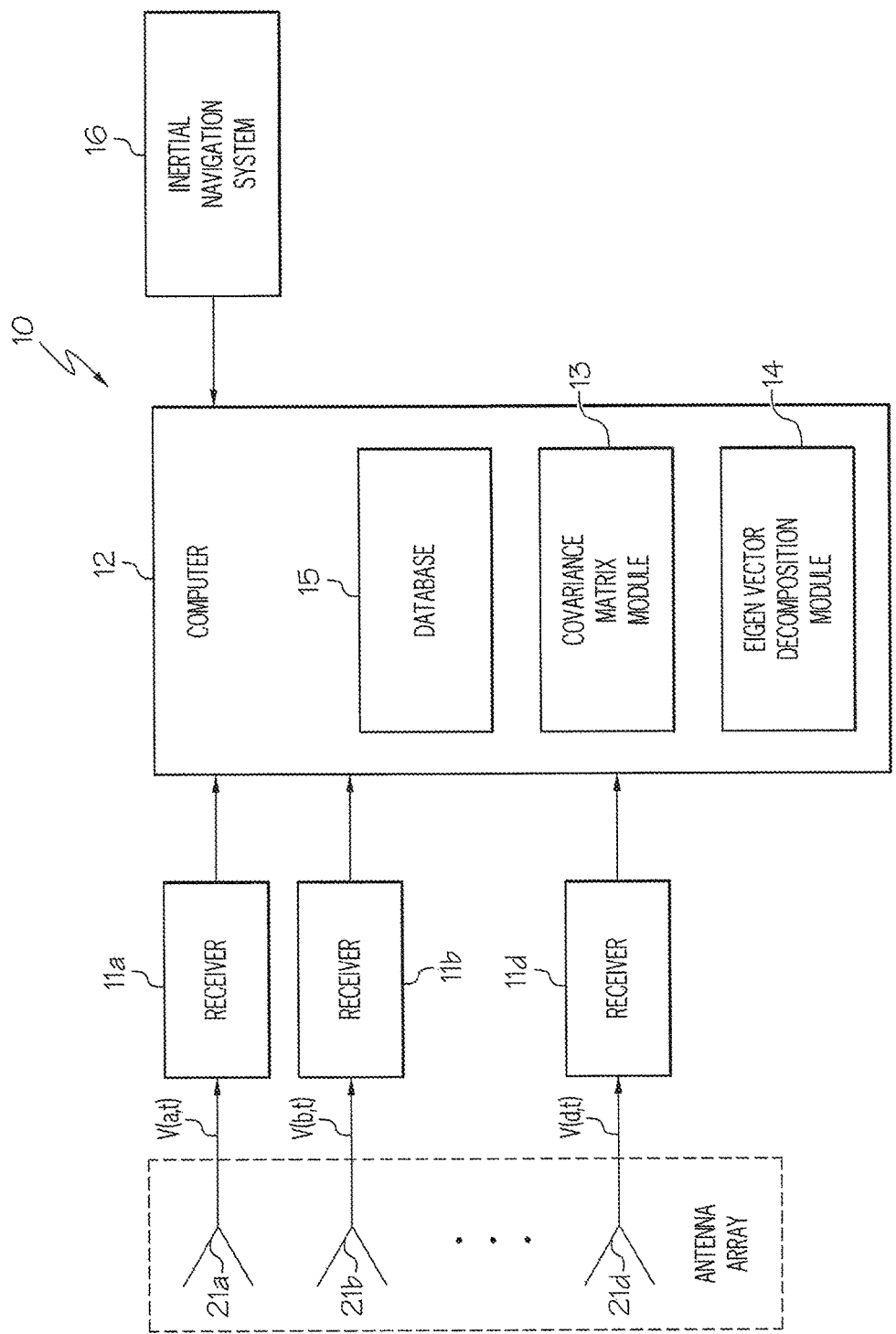
FIG. 1 is a block diagram of a direction finding/geolocation system, in accordance with one embodiment.

Referring now to the drawings and in particular to FIG. 1, there is illustrated a block diagram of a direction finding (DF) system for providing Correlation Interferometry Geo-Location (CIGL) information on radio-frequency (RF) emitters, in accordance with one embodiment of the present disclosure. As shown, a DF system 10 includes multiple receivers 11a-11d that are connected to antenna elements 21a-21d of an antenna array, respectively. DF system 10 also includes a signal processing computer 12 and an inertial navigation system 16.

During operation, an electromagnetic signal E(t) arrives at each of antenna elements 21a-21d at different times as determined by its angle of incidence $\theta^i$, $\phi^i$ with respect to the spacing of antenna elements 21a-21d. The incident angle is detected as a change in phase of the electromagnetic wave as it moves across antenna elements 21a-21d. Each of voltages V(a,t)-V(d,t) output respectfully from antenna elements 21a-21d denotes a complex waveform that is output from each of antenna elements 21a-21d, and is the only quantity that conveys information. In other words, each of voltages V(a,t)-V(d,t) represents the complex envelope of the output of one of antenna elements 21a-21d, and represents the signal of interest and an associated noise component. The complex voltages V(a,t)-V(d,t) can be represented by the following equation:

$$V(n,t) = E(t) A_r[n, \theta^i, \phi^i] + \eta(n,t)$$

where n is one of antenna elements 21a-21d. $A_r[n, \theta^i, \phi^i]$ is an antenna response vector in which ($\theta^i$, $\phi^i$) defines the azimuth $\theta^i$ and elevation $\phi^i$ of the received signals, and $\eta(n,t)$ is a noise component of received signals.

The outputs from receivers 11a-11d, in a digitized format, are sent to signal processing computer 12 having multiple processors (not shown) that can process the received signals synchronously. Signal processing computer 12 includes, for example, covariance matrix module 13, an Eigen vector decomposition module 14 and an antenna response database 15. Covariance matrix module 13 measures and processes the digitized signal samples from receivers 11*a*-11*d* into individual measurement covariance matrices that are then sent to Eigen vector decomposition module 14. Covariance matrix module 13 and Eigen vector decomposition module 14 can be implemented as software and/or hardware modules located within or separate from signal processing computer 12. Antenna response database 15 contains a set of theoretical phases that were previously collected. Each element in antenna response database 15 corresponds to a discrete azimuth and depression angle of a theoretical RF emitter in reference to a phase center on an aircraft from which measurements are performed. The position and attitude information of the aircraft are provided by inertial navigation system 16, and such information are fed to signal processing computer 12. With the above-mentioned information, DF system 10 can provide a geographical position of a source RF emitter.

Figure 2:
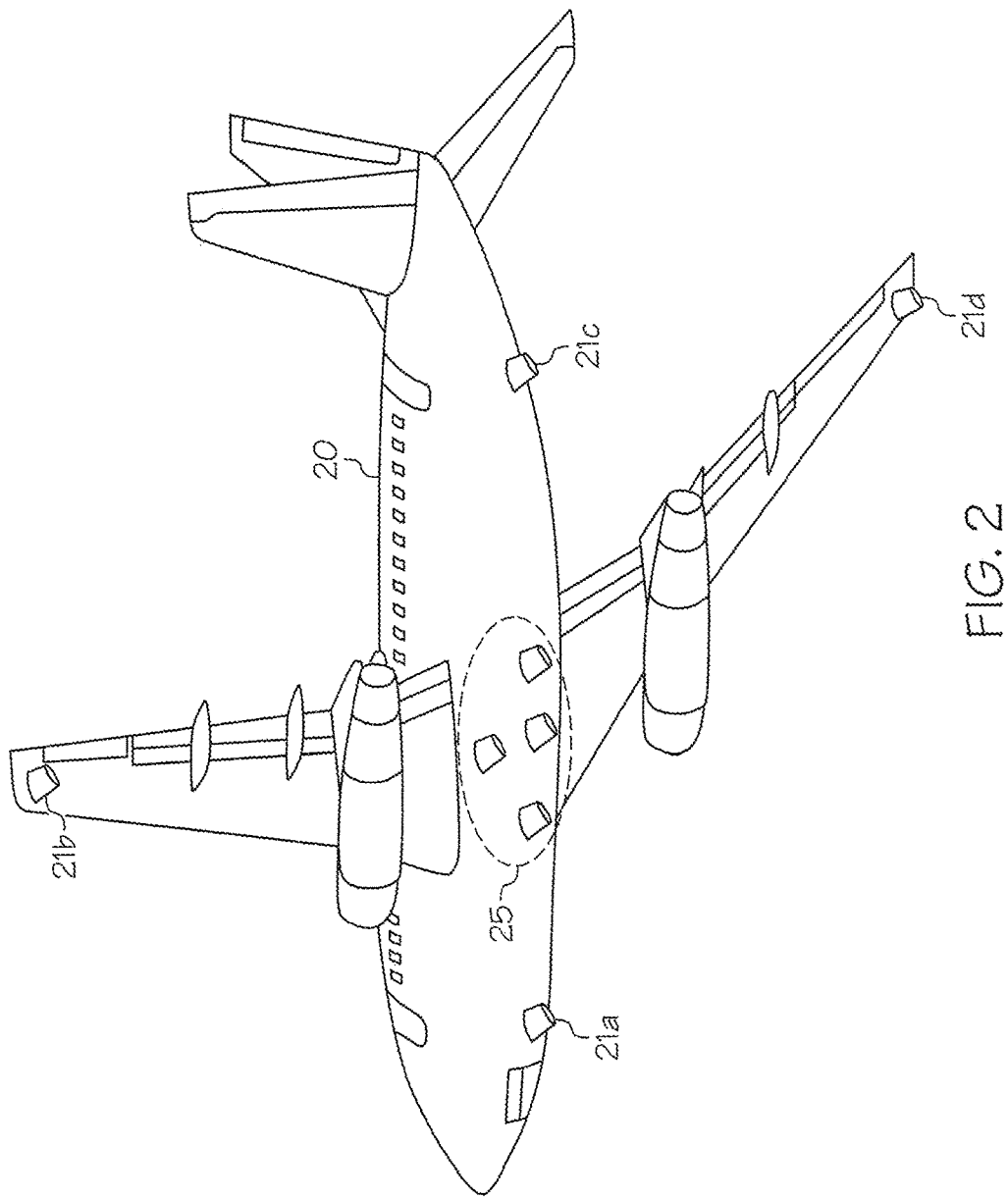
FIG. 2 shows an aircraft equipped with a direction finding antenna array to be utilized by the direction finding/geolocation system of FIG. 1.

Antenna elements 21*a*-21*d* can be mounted on an aircraft. With reference now to FIG. 2, there is illustrated an aircraft 20 equipped with a DF antenna array having individual antenna elements 21*a*-21*d*, according to one embodiment of the present disclosure. In particular, antenna elements 21*a* and 21*c* are mounted on the front and rear of the fuselage of aircraft 20, respectively, and antenna elements 21*b* and 21*d* are mounted near the ends of the wings of aircraft 20, respectively. Antenna elements 21*a*-21*d* are shown as blade antenna elements in FIG. 1, but for many applications, blade antenna elements can be replaced by broadband spiral antenna elements that are receptive to both horizontally and vertically polarized signals. The spacing of antenna elements 21*a*-21*d* provides a relatively large antenna aperture to facilitate the provisioning of accurate CIGL solutions. The selection of antenna elements 21*a*-21*d* and their physical arrangement on aircraft 20 depend on the frequencies to be received and their polarization. More than one set of DF antenna arrays can be mounted on aircraft 20 in order to cover different frequency bands and signal polarizations.

Aircraft 20 also includes an array of airborne DF antenna elements 25. In order to achieve high DF accuracy, DF antenna elements 25 are spaced as far as possible from each other, but to minimize ambiguities, there must be a sufficient number of antenna elements 25 and they cannot be too far apart. These constraints typically compel the array of antenna elements 25 to a small area near the center of the fuselage.

Figure 3:
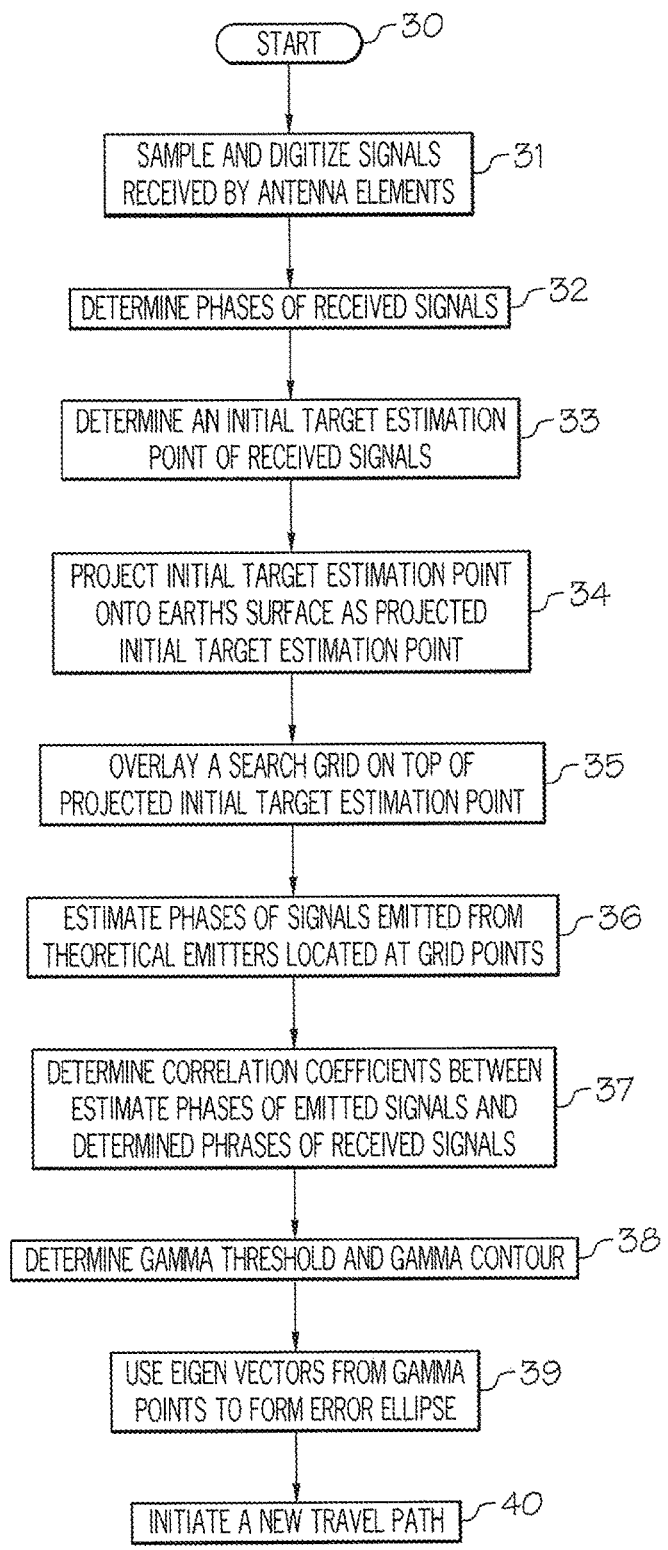
FIG. 3 is a flow diagram of a method for improving geolocation error estimation in the direction finding/geolocation system of FIG. 1.

Referring now to FIG. 3, there is illustrated a flow diagram of a method for improving geolocation error estimation in a DF system, such as DF system 10 from FIG. 1, according to one embodiment of the present disclosure. Starting at block 30, signals received by antenna elements 21*a*-21*d* are sampled and digitized, as shown in block 31. For example, once a second for multiple consecutive seconds, the signals received by antenna elements 21*a*-21*d* are sampled and digitized as pulses become available to DF system 10. The signals received by antenna elements 21*a*-21*d* are stored as complex data. The pulse collection rate depends upon the transmit characteristics (such as number of pulses) of a source RF emitter. The digitized signal samples are subsequently converted into individual phase measurements, as depicted in block 32.

An initial target estimation point (azimuth and elevation) of the received signals is then determined, as shown in block 33. The initial target estimation point can be, for example, the signal point having the highest amplitude, and such determination can be facilitated by using the position and attitude information obtained by an inertial navigation system, such as inertial navigation system 16 from FIG. 1, of an aircraft. The determined initial target estimation point is then projected onto the earth's surface as the projected initial target estimation point, as depicted in block 34.

A search grid having multiple grid points is then projected on the earth's surface for surrounding the projected initial target estimation point, as shown in block 35. The search grid points can be generated by using any gridding techniques that are known to those skilled in the art. For example, a uniform latitude and longitude spacing can be utilized to generate grid points in a region surrounding the estimated target location. Alternatively, variable spacing can be utilized to define the grid points around the estimated target location.

Assuming there is a theoretical emitter (or imaginary emitter) located at each of the grid points of the search grid, the phases of the signals emitted from the theoretical emitters are estimated, as depicted in block 36. The phase estimation can be performed by using antenna response data, such as azimuth and elevation, previously collected and stored in an antenna response database, such as antenna response database 15 from FIG. 1.

A correlation coefficient between the estimated phase of the signals emitted from a theoretical emitter located at each of the grid points on the search grid and the determined phase of the corresponding received signals (obtained from block 32) are determined, as shown in block 37. Each of the correlation coefficients represents a level of similarity between one of the estimated phases of the signals emitted from a theoretical emitter and the corresponding one of the determined phases of the received signals. Since the signals from the theoretical emitters and the signals received from the antenna elements are stored as complex data having a real component and an imaginary component, the correlation coefficients can be determined by performing a matched filter (dot product) operation on the complex data. Basically, matched filtering measures the degree of similarity between two signal vectors, and the degree of similarity is expressed in terms of correlation coefficients.

The correlation coefficients can range from 0.0 to 1.0, with 1.0 being the perfect correlation coefficient. Under ideal conditions of high signal-to-noise ratio and no platform error, antenna error and/or atmospheric propagation error, a nearly perfect correlation coefficient of 1.0 at a search grid location near the location of the source RF emitter can be achieved.

In practice, however, the process of generating correlation coefficients based on DF measurements and phase differences can be subject to a number of systemic errors. As the level of systemic errors increases, the chance of obtaining the perfect correlation decreases because the errors degrade the correlation values and diminish the precision with which the DF and geolocation measurements can be projected onto the earth's surface. Nevertheless, the accuracy of the DF and the geolocation estimate can be improved if estimates of the system errors are incorporated into the calculations. The system error estimates are incorporated into the analysis by including a margin region around the grid point having the peak correlation. The margin threshold, termed the Gamma threshold, is set as the difference between the perfect correlation and the calculated peak correlation. Correlations at or above the cutoff value along with their associated geospatial coordinates are collected as a set of points. The perimeter of the points in the set forms a closed polygon surrounding the calculated peak correlation. The outer boundary of the polygon defines the region on the surface of the earth within which the source RF emitter is equally likely to be located to within a pre-specified probability threshold. The probability is established by the accuracy requirements of the DF system. For the purposes of the present disclosure, the cutoff value is referred to as a Gamma contour, and the set of geographic points bound by the Gamma contour are referred to as Gamma points.

Accordingly, a Gamma threshold and Gamma contour are determined, as depicted in block 38. The Gamma threshold is determined by Gamma threshold=perfect correlation coefficient−calculated peak correlation where perfect correlation coefficient is 1.0. The calculated peak correlation is the grid point having the highest correlation coefficient (obtained from block 37). For example, if the peak correlation is 0.95, then the Gamma threshold is 1.0−0.95=0.05. The Gamma threshold can be utilized to generate the set of spatial coordinates of Gamma points surrounding a grid point having the highest correlation coefficient. The Gamma contour is determined by Gamma contour=calculated peak correlation−Gamma threshold Using the numbers from the above-mentioned example, Gamma contour=0.95−0.05=0.90.

The spatial coordinates of Gamma points to form an error ellipse surrounding the grid point having the highest correlation coefficient is generated, as shown in block 39. The error ellipse can be formed by decomposing the spatial coordinates of the Gamma points into a set of Eigen vectors.

Mathematically, an ellipse is completely described with a relatively small number of parameters. The parameters are a center point, semi-major axis, semi-minor axis and orientation angle. The orientation angle is the counter clockwise angle formed between the major axis of the ellipse and the X axis of the coordinate frame containing the signal sample points. An ellipse with equal semi-major and semi-minor axes forms a circle and has no dominant orientation. The equation for the uniform error polygon is derived using the geographic coordinates of the grid points contained within the Gamma contour. The geographic coordinates of the Gamma contour points are used as spatial samples from an X-Y coordinate plane where each signal sample contributes one pair of measurements towards determining the overall shape of the polygon. The measurements are used to construct a matrix, termed a covariance matrix, which identifies the spatial configuration of the polygon within the reference frame. Specifically, the covariance matrix defines the location, scale and orientation of the bounding polygon (ellipse).

The polygon formed from the covariance matrix is centered about the mean of the geographic coordinates of the Gamma points (mean X, mean Y). The remaining components of the polygon (ellipse) are determined from the Eigen value and Eigen vector decomposition, or its equivalent, of the covariance matrix formed using the Gamma points. The Eigen vectors are a pair of orthogonal unit magnitude vectors aligned with the contour gradient of the correlation surface. The largest Eigen value will scale the Eigen vector aligned with the correlation surface direction having the largest variance. This Eigen vector and Eigen value pair define the semi-major axis of the ellipse. The smaller Eigen vector and Eigen value pair map to the semi-minor axis of the ellipse. The components of the covariance matrix are also used to calculate the rotation angle of the semi-major axis of the ellipse. The rotation angle is a counterclockwise rotation angle calculated from the X axis of the reference frame.

Figure 4:
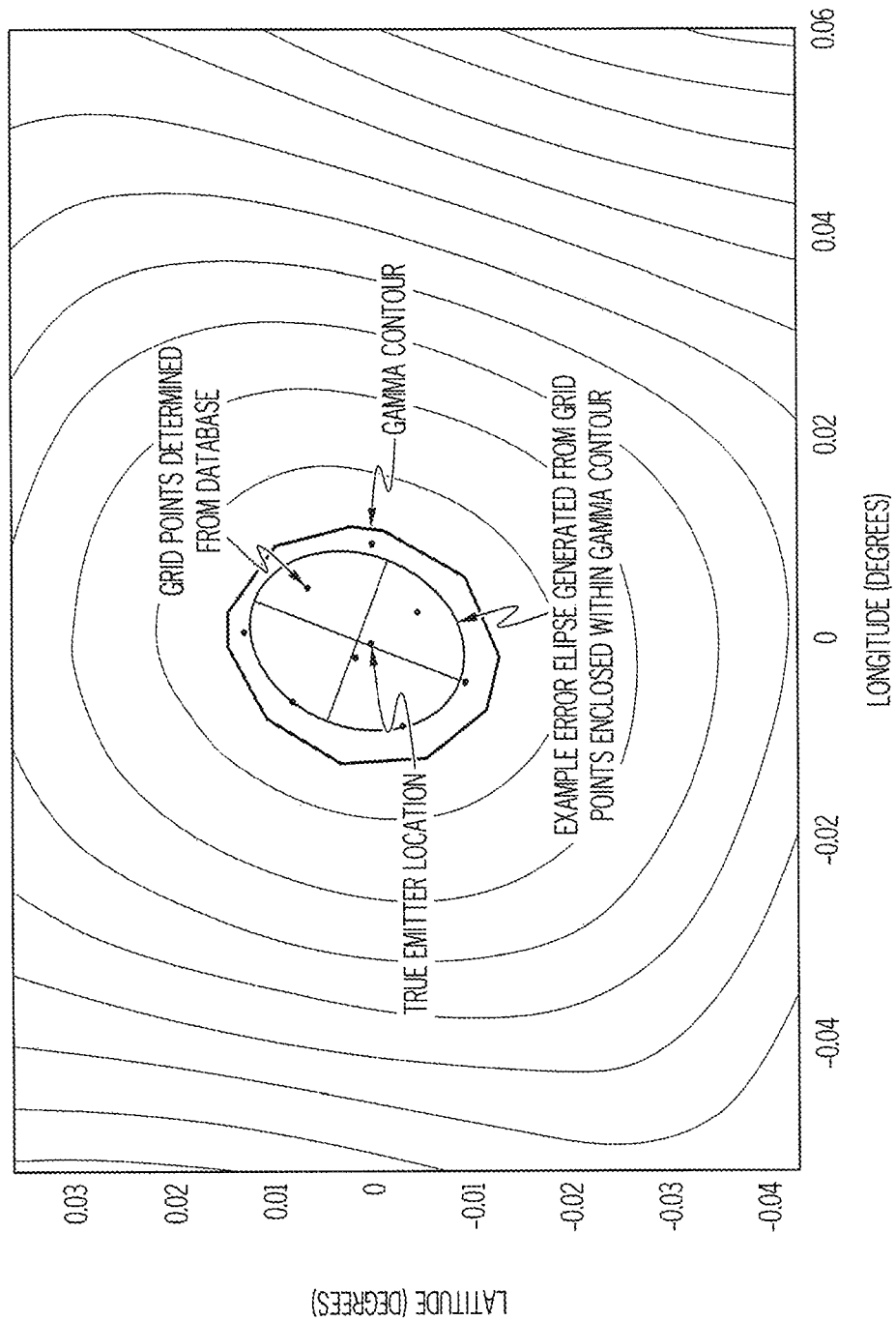
FIG. 4 shows an error ellipse that captures a set of Gamma contour points surrounding a candidate source emitter.

The Gamma points are utilized to determine the equation of a polygon (ellipse) bounded by the Gamma contour. In a manner similar to the threshold used to define the Gamma contour, the ellipse boundary formed around the Gamma points is dynamically scaled to match the error tolerance required by a DF system. For the present embodiment, the elliptical error probability is set at 90% to match the threshold established by the Gamma contour. FIG. 4 illustrates how a bounding polygon (such as an error ellipse) captures the Gamma contour points surrounding a candidate source RF emitter using CIGL-based correlation data. The area within the perimeter of the error ellipse has an equal (90%) probability of encompassing the true location of the source RF emitter. The probability of the source RF emitter being located within the error ellipse depends on the desired degree of correlation and error tolerance of the DF system.

The precision of locating the source RF emitter can be improved by iterating the geolocation method of FIG. 3. If iterations of the geolocation method of FIG. 3 need to be performed, the grid point having the highest correlation coefficient is utilized as the locus for subsequent passes through the geolocation method of FIG. 3. During each pass, the area around the peak is analyzed with increasing spatial resolution giving a refined estimate of the source RF emitter's position on the ground. The position estimate is iteratively refined until a pre-specified resolution tolerance has been attained. The refined location can be passed by the DF system onto other higher level system for further analysis.

As the result of the geolocating method, the source RF emitter is resolved to be located within the error ellipse, with the certainty as defined by the Gamma threshold. At this point, a new travel path can be initiated for aircraft and/or vehicles to avoid the source RF emitter, as depicted in block 40.

As has been described, the present invention provides a method for improving DF or geolocation error estimation in DF and geolocation systems. Those skilled in the art will appreciate that the mechanisms of the present invention are capable of being distributed as a program product in a variety of recordable type media such as compact discs and digital video discs.

While the invention has been particularly shown and described with reference to a preferred embodiment, it will be understood by those skilled in the art that various changes in form and detail may be made therein without departing from the spirit and scope of the invention.

What is claimed is:

1. A method comprising:

determining from an aircraft corresponding phases of a set of received signals emitted by a source emitter located on the Earth, wherein said source emitter is to be avoided by said aircraft;

projecting an initial target estimation point of said received signals onto the Earth's surface as a projected initial target estimation point, and overlaying a search grid having a plurality of grid points surrounding said projected initial target estimation point;

estimating corresponding phases of signals emitted from said grid points;

determining correlation coefficients between said estimated phases of said emitting signals and said determined phases of said received signals, wherein each of said correlation coefficients reflects a level of similarity between one of said estimated phases and a corresponding one of said determined phases;
identifying a high probability area where said source emitter is located by generating an error ellipse around one of said grid points having the highest correlation coefficient; and
initiating a new travel path for said aircraft to avoid said high probability area.

2. The method of claim 1, wherein said method further includes determining said initial target estimation point of said received signals by using position and attitude information obtained by an inertial navigation system of an aircraft.

3. The method of claim 1, wherein said error ellipse is defined by a Gamma threshold and a Gamma contour.

4. The method of claim 3, wherein said Gamma threshold is determined by

Gamma threshold=perfect correlation coefficient−calculated peak correlation, wherein said perfect correlation coefficient is 1.0, and said calculated peak correlation is a grid point having the highest correlation coefficient.

5. The method of claim 4, wherein said Gamma contour is determined by

Gamma contour=calculated peak correlation−Gamma threshold,

6. The method of claim 1, wherein said error ellipse is formed by using an Eigen vector from a set of Gamma points.

7. The method of claim 1, wherein said error ellipse has at least a 90% probability of encompassing the true location of said source RF emitter.

8. A non-transitory computer-readable medium having computer program product for improving geolocation in a direction finding system, said computer program product comprising:
program code for determining from an aircraft corresponding phases of a set of received signals emitted by a source emitter located on the Earth, wherein said source emitter is to be avoided by said aircraft;
program code for projecting an initial target estimation point of said received signals onto the Earth's surface as a projected initial target estimation point, and overlaying a search grid having a plurality of grid points surrounding said projected initial target estimation point;
program code for estimating corresponding phases of signals emitted from said grid points;
program code for determining correlation coefficients between said estimated phases of said emitting signals and said determined phases of said received signals, wherein each of said correlation coefficients reflects a level of similarity between one of said estimated phases and a corresponding one of said determined phases;
program code for identifying a high probability area where said source emitter is located by generating an error ellipse around one of said grid points having the highest correlation coefficient; and
program code for initiating a new travel path for said aircraft to avoid said high probability area.

9. The non-transitory computer-readable medium of claim 8, wherein said computer program product further includes program code for determining said initial target estimation point of said received signals by using position and attitude information obtained by an inertial navigation system of an aircraft.

10. The non-transitory computer-readable medium of claim 8, wherein said error ellipse is defined by a Gamma threshold and a Gamma contour.

11. The non-transitory computer-readable medium of claim 10, wherein said Gamma threshold is determined by Gamma threshold=perfect correlation coefficient−calculated peak correlation, wherein said perfect correlation coefficient is 1.0, and said calculated peak correlation is a grid point having the highest correlation coefficient.

12. The non-transitory computer-readable medium of claim 11, wherein said Gamma contour is determined by Gamma contour=calculated peak correlation−Gamma threshold, 13. The non-transitory computer-readable medium of claim 8, wherein said error ellipse is formed by using an Eigen vector from a set of Gamma points.

14. The non-transitory computer-readable medium of claim 8, wherein said error ellipse has at least a 90% probability of encompassing the true location of said source RF emitter.

15. A direction finding system, comprising:
a plurality of antenna elements for receiving signals; and
a signal processing device for
determining from an aircraft corresponding phases of a set of received signals emitted by a source emitter located on the Earth, wherein said source emitter is to be avoided by said aircraft;
projecting an initial target estimation point of said received signals onto the Earth's surface as a projected initial target estimation point, and overlaying a search grid having a plurality of grid points surrounding said projected initial target estimation point;
estimating corresponding phases of signals emitted from said grid points;
determining correlation coefficients between said estimated phases of said emitting signals and said determined phases of said received signals, wherein each of said correlation coefficients reflects a level of similarity between one of said estimated phases and a corresponding one of said determined phases;
identifying a high probability area where said source emitter is located by generating an error ellipse around one of said grid points having the highest correlation coefficient; and
initiating a new travel path for said aircraft to avoid said high probability area.

16. The direction finding system of claim 15, wherein said direction finding system further includes an inertial navigation system coupled to said signal processing device.

17. The direction finding system of claim 15, wherein said error ellipse is defined by a Gamma threshold and a Gamma contour.

18. The direction finding system of claim 17, wherein said Gamma threshold is determined by Gamma threshold=perfect correlation coefficient−calculated peak correlation, wherein said perfect correlation coefficient is 1.0, and said calculated peak correlation is a grid point having the highest correlation coefficient.

19. The direction finding system of claim 18, wherein said Gamma contour is determined by Gamma contour=calculated peak correlation−Gamma threshold,

20. The direction finding system of claim 15, wherein said error ellipse is formed by using an Eigen vector from a set of Gamma points.

21. The direction finding system of claim 15, wherein said error ellipse has at least a 90% probability of encompassing the true location of said source RF emitter.

* * * * *